United States Patent
Jiang et al.

(10) Patent No.: US 12,480,105 B2
(45) Date of Patent: Nov. 25, 2025

(54) HIGH TEMPERATURE RESISTANT REVERSE TRANSCRIPTASE MUTANTS AND USE THEREOF

(71) Applicant: Daan Gene Co., Ltd., Guangdong (CN)

(72) Inventors: Xiwen Jiang, Guangdong (CN); Aishan Liu, Guangdong (CN); Zhouquan Wang, Guangdong (CN); Sangsang Zheng, Guangdong (CN); Jiguang Zhao, Guangdong (CN); Xianlan Lian, Guangdong (CN); Xiaocheng Xie, Guangdong (CN); Xuelan Lu, Guangdong (CN); Wei Zhang, Guangdong (CN); Haojian Xu, Guangdong (CN); Zhikeng Fang, Guangdong (CN); Zhijian Wu, Guangdong (CN)

(73) Assignee: Daan Gene Co., Ltd., Guangdong (CN)

( * ) Notice: Subject to any disclaimer, the term of this patent is extended or adjusted under 35 U.S.C. 154(b) by 1274 days.

(21) Appl. No.: 17/254,376

(22) PCT Filed: Nov. 13, 2020

(86) PCT No.: PCT/CN2020/128639
§ 371 (c)(1),
(2) Date: Dec. 21, 2020

(87) PCT Pub. No.: WO2021/093845
PCT Pub. Date: May 20, 2021

(65) Prior Publication Data
US 2024/0254460 A1    Aug. 1, 2024

(30) Foreign Application Priority Data

Nov. 13, 2019   (CN) .......................... 201911105358.X

(51) Int. Cl.
*C12N 9/12*   (2006.01)
*C12N 15/10*  (2006.01)

(52) U.S. Cl.
CPC ....... *C12N 9/1276* (2013.01); *C12N 15/1096* (2013.01); *C12Y 207/07049* (2013.01)

(58) Field of Classification Search
None
See application file for complete search history.

(56) References Cited

U.S. PATENT DOCUMENTS

2005/0232934 A1   10/2005   Chen et al.
2024/0254460 A1*   8/2024   Jiang .................. C12N 15/1096

FOREIGN PATENT DOCUMENTS

| | | |
|---|---|---|
| CA | 2617790 A1 | 2/2007 |
| CN | 1807605 A | 7/2006 |
| CN | 102057039 A | 5/2011 |
| CN | 106164261 A | 11/2016 |
| CN | 110291196 A | 9/2019 |
| WO | 2007022045 A2 | 2/2007 |
| WO | 2012020759 A1 | 10/2013 |
| WO | 2015112767 A2 | 7/2015 |
| WO | 2018057909 A1 | 3/2018 |
| WO | 2018110595 A1 | 10/2019 |

OTHER PUBLICATIONS

Yasukawa et al., "Increase in thermal stability of Moloney murine leukaemia virus reverse transcriptase by site-directed mutagenesis", Journal of Biotechnology, first published Sep. 29, 2010, pp. 299-306.
Arezi et al., "Novel mutations in Moloney Murine Leukemia Virus reverse transcriptase increase thermostability through tighter binding to template-primer", Nucleic Acids Research, first published Dec. 4, 2008, pp. 473-481.
The extended European search report issued in European application No. 20824054.9, dated Oct. 31, 2022, 9 pages provided.
International Search Report and Written Opinion issued in PCT/CN2020/128639, dated Jan. 28, 2021, 21 pages provided, with English translation.
Aurimas Baranauskas et al., "Generation and characterization of new highly thermostable and processive M-MuLV reverse transcriptase variants", Protein Engineering, Design & Selection, vol. 25, No. 10, Jun. 12, 2012, cited in ISR, pp. 657-668.
International Preliminary Report on Patentability issued in PCT/CN2020/128639, issued May 17, 2022, with English translation, 5 pages provided.

* cited by examiner

*Primary Examiner* — Hope A Robinson
(74) *Attorney, Agent, or Firm* — HSML P.C.

(57) ABSTRACT

The present invention provides a high temperature resistant reverse transcriptase mutant and its use. In particular, the present invention constructs a reverse transcriptase (M-MLV) mutant library, and the mutants with improved thermostability and higher amplification efficiency are finally screened out by stepwise screening. Under high temperature conditions, the reverse transcription efficiency of the reverse transcriptase mutant of the present invention is greatly improved compared to the wild type.

4 Claims, No Drawings

Specification includes a Sequence Listing.

HIGH TEMPERATURE RESISTANT REVERSE TRANSCRIPTASE MUTANTS AND USE THEREOF

TECHNICAL FIELD

The invention belongs to the field of biotechnology. In particular, the invention relates to a high temperature resistant reverse transcriptase mutant and its use.

BACKGROUND

Murine leukemia virus reverse transcriptase (M-MLV) is a DNA polymerase that uses RNA as a template. It has RNase H activity, but does not have 3'-5' exonuclease activity. It can be used for synthesizing cDNA by reverse transcription. Because RNA has a more complex secondary structure, it has a greater impact on the reverse transcription efficiency of M-MLV enzyme. The easiest way to break the secondary structure of RNA is to break the hydrogen bonds of the secondary structure with a high temperature, thereby making the RNA a linear single strand. However, the optimal reaction temperature of the wild-type M-MLV enzyme is 37° C., and the stability and activity decrease at high temperatures. Therefore, the main direction of M-MLV enzyme engineering is to improve the thermostability of M-MLV enzyme through mutation and to adapt it to the reaction at high temperature.

The mutation engineering of M-MLV enzyme has the following ways:
1. Random mutation. The full-length sequence or a certain domain of M-MLV is randomly mutated, and then screened. MMLV mutants with high activity and high thermostability may be screened by this method, but its process is complicated, and the mutation library capacity generated by random mutations may reach 107 with a large number of inactive mutations and difficulty in screening. (see Arezi B, Hogrefe H. Novel mutations in Moloney Murine Leukemia Virus reverse transcriptase increase thermostability through tighter binding to template-primer[J]. Nucleic Acids Research, 2008, 37(2): 473-481.)
2. Site-directed mutations to specific active sites. This method is highly targeted and increases the enzyme activity by increasing the affinity of amino acids at key active site such as nucleic acid binding sites and metal ion binding sites to a substrate. However, such method lacks the analysis of the overall structure of the enzyme and cannot improve the stability of the enzyme as a whole. (see Yasukawa K, Mizuno M, Konishi A, et al. Increase in thermal stability of Moloney murine leukaemia virus reverse transcriptase by site-directed mutagenesis[J]. Journal of Biotechnology, 2010, 150 (3):299-306.)

In general, due to the complexity of protein structure, not only the amino acids at the active sites but also some amino acids far away from the active sites may affect the overall structure and performance of the enzyme, so there is great uncertainty in enzyme engineering.

SUMMARY

The object of the present invention is to provide a reverse transcriptase mutant which is resistant to high temperature and has high reverse transcription efficiency.

In the first aspect of the present invention, a reverse transcriptase mutant is provided, wherein the reverse transcriptase mutant comprises a mutation at at least one (may be one, two, three, four, or five) site selected from the group consisting of the amino acid residue at position 446, the amino acid residue at position 313, the amino acid residue at position 583, the amino acid residue at position 607, and the amino acid residue at position 221, wherein the amino acid residues are numbered according to SEQ ID NO: 1. Preferably, the reverse transcriptase mutant comprises mutations at two or three sites selected from the group consisting of the amino acid residue at position 446, the amino acid residue at position 313, the amino acid residue at position 583, the amino acid residue at position 607, and the amino acid residue at position 221, wherein the amino acid residues are numbered according to SEQ ID NO: 1.

The amino acid sequence of the corresponding wild-type murine leukemia virus reverse transcriptase (M-MLV) is as set forth in SEQ ID NO: 1.

In another preferred embodiment, in the reverse transcriptase mutant, the amino acid residue at position 446 is mutated to Cys.

In another preferred embodiment, in the reverse transcriptase mutant, the amino acid residue at position 313 is mutated to His or Gln.

In another preferred embodiment, in the reverse transcriptase mutant, the amino acid residue at position 583 is mutated to Asn.

In another preferred embodiment, in the reverse transcriptase mutant, the amino acid residue at position 607 is mutated to Lys.

In another preferred embodiment, in the reverse transcriptase mutant, the amino acid residue at position 221 is mutated to Arg.

In another preferred embodiment, the amino acid residue at position 583 corresponding to the amino acid sequence of wild-type murine leukemia virus reverse transcriptase (M-MLV) in the reverse transcriptase mutant is mutated, wherein the amino acid residue is numbered according to SEQ ID NO: 1.

In another preferred embodiment, the amino acid residue at position 313 corresponding to the amino acid sequence of wild-type murine leukemia virus reverse transcriptase (M-MLV) in the reverse transcriptase mutant is mutated, wherein the amino acid residue is numbered according to SEQ ID NO: 1.

In another preferred embodiment, the amino acid residue at position 221 corresponding to the amino acid sequence of wild-type murine leukemia virus reverse transcriptase (M-MLV) in the reverse transcriptase mutant is mutated, wherein the amino acid residue is numbered according to SEQ ID NO: 1.

In another preferred embodiment, the amino acid residue at position 607 corresponding to the amino acid sequence of wild-type murine leukemia virus reverse transcriptase (M-MLV) in the reverse transcriptase mutant is mutated, wherein the amino acid residue is numbered according to SEQ ID NO: 1.

In another preferred embodiment, the amino acid residue at position 446 corresponding to the amino acid sequence of wild-type murine leukemia virus reverse transcriptase (M-MLV) in the reverse transcriptase mutant is mutated, wherein the amino acid residue is numbered according to SEQ ID NO: 1.

In another preferred embodiment, the amino acid sequence of the reverse transcriptase mutant has at least about 80% homology; more preferably, at least about 90% homology; most preferably, at least about 95% homology; for example, at least about 96%, 97%, 98%, 99% homology with SEQ ID NO: 1.

In another preferred embodiment, the amino acid residues at positions 583 and 313 in the reverse transcriptase mutant are mutated.

In another preferred embodiment, the amino acid residues at positions 313 and 221 in the reverse transcriptase mutant are mutated.

In another preferred embodiment, the amino acid residues at positions 583 and 446 in the reverse transcriptase mutant are mutated.

In another preferred embodiment, the amino acid residues at positions 583 and 221 in the reverse transcriptase mutant are mutated.

In another preferred embodiment, the amino acid residues at positions 313 and 446 in the reverse transcriptase mutant are mutated.

In another preferred embodiment, the amino acid residues at positions 313 and 607 in the reverse transcriptase mutant are mutated.

In another preferred embodiment, the amino acid residues at positions 313, 583 and 221 in the reverse transcriptase mutant are mutated.

In another preferred embodiment, the amino acid residues at positions 313, 583 and 607 in the reverse transcriptase mutant are mutated.

In another preferred embodiment, the amino acid residues at positions 313, 583 and 446 in the reverse transcriptase mutant are mutated.

In another preferred embodiment, the amino acid residues at positions 583 and 313 in the reverse transcriptase mutant are mutated; and the amino acid residue at position 583 is mutated to Asn, and the amino acid residue at position 313 is mutated to His or Gln.

In another preferred embodiment, the amino acid residues at positions 313 and 221 in the reverse transcriptase mutant are mutated; and the amino acid residue at position 313 is mutated to Gln, and the amino acid residue at position 221 is mutated to Arg.

In another preferred embodiment, the amino acid residues at positions 583 and 446 in the reverse transcriptase mutant are mutated; and the amino acid residue at position 583 is mutated to Asn, and the amino acid residue at position 446 is mutated to Cys.

In another preferred embodiment, the amino acid residues at positions 583 and 221 in the reverse transcriptase mutant are mutated; and the amino acid residue at position 583 is mutated to Asn, and the amino acid residue at position 221 is mutated to Arg.

In another preferred embodiment, the amino acid residues at positions 313 and 446 in the reverse transcriptase mutant are mutated; and the amino acid residue at position 313 is mutated to Gln, and the amino acid residue at position 446 is mutated to Cys.

In another preferred embodiment, the amino acid residues at positions 313 and 607 in the reverse transcriptase mutant are mutated; and the amino acid residue at position 313 is mutated to Gln, and the amino acid residue at position 607 is mutated to Lys.

In another preferred embodiment, the amino acid residues at positions 313, 583 and 221 in the reverse transcriptase mutant are mutated; and the amino acid residue at position 313 is mutated to Gln, the amino acid residue at position 583 is mutated to Asn, and the amino acid residue at position 221 is mutated to Arg.

In another preferred embodiment, the amino acid residues at positions 313, 583 and 607 in the reverse transcriptase mutant are mutated; and the amino acid residue at position 313 is mutated to Gln, the amino acid residue at position 583 is mutated to Asn, and the amino acid residue at position 607 is mutated to Lys.

In another preferred embodiment, the amino acid residues at positions 313, 583 and 446 in the reverse transcriptase mutant are mutated; and the amino acid residue at position 313 is mutated to Gln, the amino acid residue at position 583 is mutated to Asn, and the amino acid residue at position 446 is mutated to Cys.

In another preferred embodiment, the reverse transcription efficiency of the reverse transcriptase mutant at a high temperature (58° C.) is increased by more than 10 times, preferably by more than 20 times, and more preferably by 30 times compared to the wild type.

In the second aspect of the present invention, a polynucleotide molecule encoding the reverse transcriptase mutant of the first aspect of the present invention is provided.

In the third aspect of the present invention, a vector comprising the nucleic acid molecule of the second aspect of the present invention is provided.

In the fourth aspect of the present invention, a host cell which comprises the vector of the first aspect of the present invention or has the nucleic acid molecule of the second aspect of the present invention chromosomally integrated is provided.

In another preferred embodiment, the host cell is a prokaryotic cell or a eukaryotic cell.

In another preferred embodiment, the prokaryotic cell is *Escherichia coli*.

In another preferred embodiment, the eukaryotic cell is a yeast cell.

In the fifth aspect of the present invention, a method for preparing the reverse transcriptase mutant of the first aspect of the present invention is provided, the method comprises steps of:
  (i) Culturing the host cell of the fourth aspect of the present invention under suitable conditions for expressing the reverse transcriptase mutant; and
  (ii) Isolating the reverse transcriptase mutant.

In another preferred embodiment, the temperature for culturing the host cell in step (i) is 20° C.-40° C.; preferably 25° C.-37° C., such as 35° C.

In the sixth aspect of the present invention, a kit comprising the reverse transcriptase mutant of the first aspect of the present invention is provided.

In another preferred embodiment, the kit further comprises one or more components selected from the group consisting of:
  dNTPs, buffer, primers, probe, and pure water.

In the seventh aspect of the present invention, use of the reverse transcriptase mutant of the first aspect of the present invention in the preparation of reverse transcription detection reagents or reverse transcription kits is provided.

In the eighth aspect of the present invention, an RNA reverse transcription method is provided, the method comprises steps of:
  (1) Providing a RNA-containing sample; and
  (2) Performing a reverse transcription reaction
    the reverse transcriptase mutant of the first aspect of the present invention is used to perform the reverse transcription reaction on the RNA-containing sample provided in step (1).

In another preferred embodiment, in step (2), the temperature of the reverse transcription reaction is 55° C. or higher, preferably 58° C. or higher.

It should be understood that, within the scope of the present invention, the above-mentioned technical features of the present invention and the technical features specifically described in the following (such as examples) can be combined with each other to form a new or preferred technical solution. Because of the limitation of length, no more tautology here

EMBODIMENTS

The inventor constructs a reverse transcriptase (M-MLV) mutation library by extensive and in-depth research. After stepwise screening, mutants with improved thermostability and higher amplification efficiency are finally screened out. On this basis, the present invention has been completed.

Before describing the present invention, it should be understood that the present invention is not limited to the specific methods and experimental conditions described, because such methods and conditions may vary. It should also be understood that the terms used herein are only intended to describe specific embodiments and are not intended to be limiting, and the scope of the present invention will only be limited by the appended claims.

Unless otherwise defined, all technical and scientific terms used herein have the same meaning as commonly understood by those of ordinary skill in the art to which the present invention belongs. As used herein, when used in reference to a specifically recited value, the term "about" means that the value can vary from the recited value by no more than 1%. For example, as used herein, the expression "about 100" includes all values between 99 and 101 (e.g., 99.1, 99.2, 99.3, 99.4, etc.).

Although any methods and materials similar or equivalent to those described in the present invention can be used in the practice or testing of the present invention, the preferred methods and materials are exemplified herein.

Reverse Transcriptase

A reverse transcriptase is also called a RNA-dependent DNA polymerase. Such enzyme uses RNA as a template, dNTP as a substrate, tRNA (mainly tryptophan tRNA) as a primer, and synthesizes from 5' to 3' a single DNA strand that is complementary to the RNA template on the 3'-OH end of the tRNA, according to the principle of base pairing. This single DNA strand is called complementary DNA (cDNA).

A reverse transcriptase can be used in synthesis of first-strand cDNA, production of cDNA probes, RNA transcription, sequencing and reverse transcription reactions of RNA. The reverse transcriptase commonly used in this field comprise murine leukemia virus (M-MLV) reverse transcriptase and avian myeloblastoma virus (AMV) reverse transcriptase.

In a preferred embodiment of the present invention, the wild-type M-MLV enzyme protein sequence of the present invention is as follows:

(SEQ ID NO: 1)
TLNIEDEHRLHETSKEPDVSLGSTWLSDFPQAWAETGGMGLAVRQ

APLIIPLKATSTPVSIKQYPMSQEARLGIKPHIQRLLDQGILVPC

QSPWNTPLLPVKKPGTNDYRPVQDLREVNKRVEDIHPTVPNPYNL

LSGLPPSHQWYTVLDLKDAFFCLRLHPTSQPLFAFEWRDPEMGIS

GQLTWTRLPQGFKNSPTLFDEALHRDLADFRIQHPDLILLQYVDD

LLLAATSELDCQQGTRALLQTLGNLGYRASAKKAQICQKQVKYLG

YLLKEGQRWLTEARKETVMGQPTPKTPRQLREFLGTAGFCRLWIP

GFAEMAAPLYPLTKTGTLFNWGPDQQKAYQEIKQALLTAPALGLP

DLTKPFELFVDEKQGYAKGVLTQKLGPWRRPVAYLSKKLDPVAAG

WPPCLRMVAAIAVLTKDAGKLTMGQPLVILAPHAVEALVKQPPDR

WLSNARMTHYQALLLDTDRVQFGPVVALNPATLLPLPEEGLQHNC

LDILAEAHGTRPDLTDQPLPDADHTWYTDGSSLLQEGORKAGAAV

TTETEVIWAKALPAGTSAQRAELIALTQALKMAEGKKLNVYTDSR

YAFATAHIHGEIYRRRGLLTSEGKEIKNKDEILALLKALFLPKRL

SIIHCPGHQKGHSAEARGNRMADQAARKAAITETPDTSTLL

In a preferred embodiment of the present invention, the codon-optimized wild-type M-MLV DNA sequence WT is as follows:

(SEQ ID NO: 2)
ACGCTGAATATCGAGGACGAACACCGTCTGCACGAAACCAGCAAG

GAGCCGGACGTTAGTCTGGGTAGCACGTGGCTGAGCGATTTTCCA

CAAGCGTGGGCGGAAACCGGTGGTATGGGTCTCGCCGTTCGCCAA

GCCCCACTCATTATCCCACTGAAAGCCACGAGCACGCCGGTGAGC

ATCAAGCAGTACCCGATGAGCCAAGAAGCCCGCCTCGGCATTAAA

CCGCATATTCAGCGTCTGCTGGACCAAGGCATTCTGGTGCCGTGC

CAGAGTCCGTGGAATACGCCACTGCTCCCGGTTAAGAAGCCGGGC

ACCAACGATTATCGCCCGGTTCAAGACCTCCGCGAAGTGAACAAG

CGCGTGGAAGATATCCATCCGACCGTGCCAAATCCGTACAATCTG

CTGAGTGGCCTCCCGCCGAGTCATCAATGGTACACCGTGCTGGAT

CTCAAGGATGCGTTTTTCTGCCTCCGTCTGCATCCAACCAGCCAG

CCACTCTTTGCGTTTGAGTGGCGCGACCCAGAAATGGGTATCAGC

GGTCAACTGACGTGGACGCGTCTGCCGCAAGGCTTCAAAAACAGC

CCGACGCTGTTCGATGAGGCCCTCCATCGCGATCTGGCGGATTTC

CGTATCCAGCATCCAGATCTGATTCTGCTGCAGTACGTTGACGAT

CTGCTCCTCGCGGCCACCAGTGAACTGGATTGCCAGCAAGGTACC

CGTGCGCTGCTGCAGACGCTGGGCAATCTGGGCTACCGTGCCAGC

GCGAAAAAGGCGCAAATCTGCCAGAAGCAAGTTAAGTACCTCGGT

TATCTGCTGAAAGAGGGTCAACGCTGGCTGACCGAGGCGCGTAAA

GAGACCGTTATGGGTCAGCCAACGCCAAAGACGCCACGCCAGCTC

CGCGAATTTCTGGGTACCGCCGGCTTCTGTCGTCTGTGGATTCCG

GGCTTCGCGGAAATGGCGGCGCCACTCTACCCGCTGACCAAAACC

GGTACCCTCTTCAATTGGGGCCCAGATCAGCAGAAGGCCTACCAA

GAAATTAAACAAGCGCTGCTCACCGCGCCGGCCCTCGGTCTCCCA

GATCTGACCAAACCGTTTGAGCTGTTCGTGGACGAGAAGCAAGGC

TACGCCAAAGGCGTGCTGACCCAGAAACTCGGTCCATGGCGTCGT

-continued

```
CCGGTGGCCTACCTCAGTAAGAAACTGGATCCAGTTGCGGCGGGT
TGGCCGCCATGTCTCCGTATGGTGGCGGCGATTGCCGTTCTGACC
AAAGACGCCGGCAAACTCACCATGGGTCAGCCGCTGGTTATTCTC
GCCCCACATGCGGTGGAAGCGCTGGTTAAACAACCGCCAGACCGC
TGGCTGAGCAATGCCCGCATGACCCATTATCAAGCGCTGCTGCTG
GACACCGACCGCGTTCAGTTCGGTCCGGTGGTTGCGCTGAATCCA
GCGACGCTGCTGCCGCTGCCAGAAGAAGGTCTGCAGCACAACTGT
CTGGACATTCTGGCCGAGGCCCATGGCACCCGTCCAGATCTCACC
GATCAGCCACTGCCAGACGCCGATCATACGTGGTACACCGATGGT
AGTAGTCTGCTGCAAGAAGGTCAACGTAAAGCGGGTGCCGCGGTG
ACGACGGAAACCGAGGTGATCTGGGCCAAAGCGCTGCCAGCGGGT
ACCAGCGCGCAACGTGCGGAACTGATCGCGCTGACCCAAGCGCTC
AAAATGGCCGAGGGCAAGAAACTCAACGTGTACACCGACAGTCGC
TACGCGTTTGCGACCGCGCACATCCACGGTGAGATTTATCGCCGC
CGTGGTCTGCTCACGAGCGAAGGTAAGGAGATCAAGAATAAGGAC
GAGATCCTCGCGCTGCTGAAAGCCCTCTTTCTGCCGAAACGTCTG
AGCATCATCCATTGCCCGGGTCACCAGAAGGGCCACAGTGCGGAA
GCGCGCGGTAATCGCATGGCCGATCAAGCCGCGCGCAAAGCGGCG
ATTACGGAAACCCCGGATACGAGCACGCTGCTG
```

Screening and Preparation of Mutants

In the present invention, Gibbs free energy change value (DDG) of the enzyme molecule after a single point mutation is calculated to measure the change in molecular stability after the mutation. DDG value (Delta Delta G) is the value of Gibbs free energy change of a molecule. The process of transforming a protein molecule from a normal folded state to an irregularly curled state requires energy, of which the value is ΔG value that can be used to measure the stability of the protein. The higher the ΔG value, the more energy required for protein denaturation and the higher the temperature at which the protein is denatured, the more stable the protein.

A protein undergoes site-directed mutation, and the interaction of each amino acid changes, which changes the ΔG value. The difference between the ΔG value of the wild-type protein and that of the mutant is DDG value. A DDG value >0 indicates that the ΔG value of the mutant protein is lower than that of the wild type and the protein is less stable; and a DDG value <0 indicates that the ΔG value of the mutant protein is higher than that of the wild type and the protein is more stable. Therefore, the DDG value can be used to predict the structural stability changes of a protein after site-directed mutation. The mutations with higher DDG values are selected from a series of mutants, used to construct a MMLV protein mutation library, expressed and purified, determined for the activity and thermostability of mutated MMLV, and screened for single-point mutants with high activity and thermostability. However, due to the complexity of protein structure, it is impossible to obtain mutants that meet actual requirements only by prediction, and in most cases, the mutants obtained by simulation and prediction will have a significantly reduced enzyme activity.

After a large number of screenings, the following 6 mutation sites are screened out in the present invention to enable the M-MLV enzyme to obtain high temperature resistance and high activity:

| No. | Wild-type amino acid | Position | Mutated amino acid |
|---|---|---|---|
| Mu_15 | Gln | 446 | Cys |
| Mu_16 | Trp | 313 | His |
| Mu_26 | Trp | 313 | Gln |
| Mu_36 | Asp | 583 | Asn |
| Mu_38 | Gln | 607 | Lys |
| Mu_40 | Gln | 221 | Arg |

The above 6 mutation sites are combined to construct 10 MMLV mutants, and MMLV mutants with better performance than the above 6 single point mutations are obtained.

Accordingly, in a preferred embodiment of the present invention, the present invention provides an M-MLV enzyme mutant comprising mutations at at least two (may be two, three, four, or five) sites selected from the group consisting of the amino acid residue at position 446, the amino acid residue at position 313, the amino acid residue at position 583, the amino acid residue at position 607, and the amino acid residue at position 221, wherein the amino acid residues are numbered according to SEQ ID NO: 1.

In a preferred embodiment, the M-MLV enzyme mutant of the present invention is as follows:

| No. | Wild-type amino acid | Position | Mutated amino acid |
|---|---|---|---|
| Mu_41 | Asp | 583 | Asn |
|  | Trp | 313 | Gln |
| Mu_42 | Asp | 583 | Asn |
|  | Trp | 313 | His |
| Mu_43 | Trp | 313 | Gln |
|  | Gln | 221 | Arg |
| Mu_44 | Asp | 583 | Asn |
|  | Gln | 446 | Cys |
| Mu_45 | Asp | 583 | Asn |
|  | Gln | 221 | Arg |
| Mu_46 | Trp | 313 | Gln |
|  | Gln | 446 | Cys |
| Mu_47 | Trp | 313 | Gln |
|  | Gln | 607 | Lys |
| Mu_48 | Trp | 313 | Gln |
|  | Asp | 583 | Asn |
|  | Gln | 221 | Arg |
| Mu_49 | Trp | 313 | Gln |
|  | Asp | 583 | Asn |
|  | Gln | 607 | Lys |
| Mu_50 | Trp | 313 | Gln |
|  | Asp | 583 | Asn |
|  | Gln | 446 | Cys |

The reverse transcription efficiency of the M-MLV enzyme mutant at a high temperature (58° C.) is increased by more than 10 times, preferably by more than 20 times, and more preferably by more than 30 times compared to the wild type.

In a preferred embodiment, the test method of reverse transcription efficiency is as follows:

Total RNA is extracted from Hela cells as a template, and subjected to reverse transcription reaction according to the following system:

| | |
|---|---|
| Total RNA | 500 ng |
| 5XRT buffer | 4 ul |
| dNTPs (2.5 mM) | 2 ul |
| Random 6 random primers (20 pmol/ul) | 1 ul |
| MMLV protein sample | 1 ul |
| DdH$_2$O | to 20 ul |

The wild-type and mutant MMLV proteins are subjected to reaction according to above system, 58° C. for 15 minutes, and 75° C. for 5 minutes for inactivation; then the reverse transcription product is taken, and the fluorescence quantitative PCR detection is performed according to the following system:

| | |
|---|---|
| Reverse transcription product | 1 ul |
| GAPDH-PF primer (2 pmol/ul) | 2 ul |
| GAPDH-PR primer (2 pmol/ul) | 2 ul |
| 2XQ-PCR Mix | 10 ul |
| DdH$_2$O | 5 ul |

Q-PCR program: 95° C. for 3 minutes, (95° C. for 15 seconds, 60° C. for 15 seconds, 72° C. for 15 seconds, and reading fluorescence signal)×40 cycles.

The wild-type reverse transcriptase efficiency is set as 100%, the reverse transcription efficiency of the mutant type compared to that of the wild-type reverse transcriptase is calculated according to the following formula:

$$\text{Reverse transcriptase efficiency} = 100\% \times 2^{\left(Ct_{wild\text{-}type} - Ct_{mutant}\right)}$$

wherein, the sequences of Random 6 primers are as follows:
NNNNNN (N=A or T or G or C)
The sequence of GAPDH-PF primer is as follows:

```
                                           (SEQ ID NO: 3)
          GCCTGCTTCACCACCTTCTT
```

The sequence of GAPDH-PR primer is as follows

```
                                           (SEQ ID NO: 4)
          TGAACGGGAAGCTCACTGGC
```

Those skilled in the art may obtain the M-MLV enzyme gene sequence of the present invention by conventional methods, such as full artificial synthesis or PCR synthesis. A preferred synthesis method is asymmetric PCR method. Asymmetric PCR method uses a pair of primers of unequal amounts to produce a large amount of single-stranded DNA (ssDNA) after PCR amplification. This pair of primers are called non-restricted primer and restricted primer, respectively, and their ratio is generally 50-100:1. In the first 10-15 cycles of PCR reaction, the amplified product is mainly double-stranded DNA, but when the restricted primer (low-concentration primer) is consumed, the PCR guided by the non-restrictive primer (high-concentration primer) will produce a large amount of single-stranded DNA. The primers used for PCR may be appropriately selected according to the sequence information of the present invention disclosed herein, and may be synthesized by conventional methods. The amplified DNA/RNA fragments may be separated and purified by conventional methods such as gel electrophoresis.

The M-MLV enzyme mutant of the present invention may be expressed or produced by conventional recombinant DNA technology, comprising steps of:
(1) Transforming or transducing a suitable host cell with a polynucleotide encoding the protein of the present invention, or a recombinant expression vector containing the polynucleotide;
(2) Culturing host cells in a suitable medium; and
(3) Separating and purifying the target protein from the culture medium or cells to obtain the M-MLV enzyme mutant.

Methods well known to those skilled in the art may be used to construct an expression vector containing the DNA sequence encoding the M-MLV enzyme of the present invention and suitable transcription/translation control signals, preferably a commercially available vector: pET28. These methods comprise in vitro recombinant DNA technology, DNA synthesis technology, and in vivo recombination technology. Said DNA sequence may be effectively linked to an appropriate promoter in the expression vector to guide mRNA synthesis. The expression vector also comprises a ribosome binding site for translation initiation and a transcription terminator. In addition, the expression vector preferably comprises one or more selectable marker genes to provide phenotypic traits for selecting transformed host cells.

The recombinant vector comprises from 5' to 3': a promoter, a target gene and a terminator. The recombinant vector may further comprises the following elements if needed: protein purification tag; 3' polynucleotideization signal; non-translated nucleic acid sequence; transport and targeting nucleic acid sequence; selection marker (antibiotic resistance gene, fluorescent protein, etc.); enhancer; or operator.

The methods for preparing recombinant vectors are well known to those skilled in the art. The expression vector may be a bacterial plasmid, bacteriophage, yeast plasmid, plant cell virus, mammalian cell virus or other vectors. In short, any plasmid and vector can be used as long as it can replicate and be stable in a host.

Those skilled in the art may use well-known methods to construct a vector containing the promoter and/or target gene sequence of the present invention. These methods comprise in vitro recombinant DNA technology, DNA synthesis technology, and in vivo recombination technology.

The expression vector of the present invention may be used to transform a suitable host cell so that the host transcribes the target RNA or expresses the target protein. The host cell may be a prokaryotic cell, such as *Escherichia coli, Corynebacterium glutamicum, Brevibacterium flavum, Streptomyces, Agrobacterium*; or a lower eukaryotic cell, such as yeast cell; or a higher eukaryotic cell, such as a plant cell. Those skilled in the art know how to select appropriate vectors and host cells. Transformation of a host cell with recombinant DNA may be performed by conventional techniques well known to those skilled in the art. When the host is a prokaryotic organism (such as *Escherichia coli*), it can be treated by CaCl$_2$ method or electroporation method. When the host is a eukaryote, the following DNA transfection methods may be selected: calcium phosphate co-precipitation method, conventional mechanical methods (such as microinjection, electroporation, liposome packaging, etc.). Transformation of a plant may be performed by *agrobacterium* transformation or gene gun transformation, such as leaf disc method, immature embryo transformation method, flower bud soaking method, etc. The transformed plant cell, tissue or organ can be regenerated by conventional methods to obtain a transgenic plant.

The term "operably linked" means that the target gene to be transcribed and expressed is linked to its control sequence in a conventional manner in the art for expression.

Cultivation of Engineered Bacteria and Fermentation Production of Target Protein After obtaining an engineered cell, the engineered cell may be cultured under a suitable condition for expressing the protein encoded by the gene sequence of the present invention. Depending on the host cell, the culture medium used in the culture may be selected from various conventional culture media, and the culture is carried out under a condition suitable for the growth of the host cell. After the host cell has grown to an appropriate cell density, the selected promoter is induced by a suitable method (such as temperature conversion or chemical induction), and the cell is further cultured for a period.

In the present invention, conventional fermentation conditions can be used. Representative conditions include (but are not limited to):
(a) Regarding temperature, the fermentation and induction temperature of M-MLV enzyme is maintained at 25-37° C.;
(b) Regarding the pH during the induction period, it is controlled at 3-9;
(c) Regarding dissolved oxygen (DO), DO is controlled at 10-90%, and the maintenance of dissolved oxygen can be solved by the introduction of oxygen/air mixed gas;
(d) Regarding feeding, the types of feeding suitably comprise carbon sources such as glycerol, methanol, glucose, etc., which can be fed separately or mixed;
(e) Regarding the IPTG concentration during the induction period, any conventional induction concentration may be used in the present invention, and the IPTG concentration is usually controlled at 0.1-1.5 mM;
(f) Regarding the induction time, there is no particular limitation, and it is usually 2-20 hours, preferably 5-15 hours.

The target protein M-MLV enzyme of the present invention is stored in *E. coli* cells, the host cells are collected by a centrifuge, and then broken by high pressure, mechanical force, enzymatic cell lysis or other cell disruption methods, and the recombinant protein is released, preferably by high pressure method. The host cell lysate may be preliminarily purified by methods such as flocculation, salting out, ultrafiltration, etc., followed by chromatography, ultrafiltration, etc., or may be directly purified by chromatography.

Chromatography comprises cation exchange chromatography, anion exchange chromatography, gel filtration chromatography, hydrophobic chromatography, affinity chromatography, etc. Common chromatography methods comprise:

1. Anion Exchange Chromatography

Anion exchange chromatography media include (but are not limited to): Q SEPHAROSE®, DEAE-SEPHAROSE™. If the salt concentration of the fermentation sample is high, which affects the combination with the ion exchange medium, the salt concentration should be reduced prior to ion exchange chromatography. The balance buffer of the sample can be replaced by dilution, ultrafiltration, dialysis, gel filtration chromatography and other means until it is similar to the corresponding ion exchange column balance solution system, and then the sample is loaded for salt concentration or pH gradient elution.

2. Hydrophobic Chromatography

Hydrophobic chromatography media include (but are not limited to): PHENYL-SEPHAROSE™, BUTYL-SEPHAROSE™, and OCTYLE-SEPHAROSE™. The salt concentration of the sample is increased by adding NaCl, $(NH_4)_2SO_4$, etc., and then the sample is loaded, and eluted by reducing the salt concentration. Contaminated proteins with large differences in hydrophobicity are removed by hydrophobic chromatography.

3. Gel Chromatography

Gel chromatography media include (but are not limited to): SEPHACRYL®, SUPERDEX®, SEPHADEX®, etc. Replace the buffer system is replaced by gel filtration chromatography, or further refined.

4. Affinity Chromatography

Affinity chromatography media include (but are not limited to): HiTrap™Heparin HPColumns.

5. Membrane Chromatography

Ultrafiltration media include: organic membranes such as polysulfone membranes, inorganic membranes such as ceramic membranes, metal membranes, etc. Purification and concentration may be achieved by membrane filtration.

The main advantages of the present invention are:
(1) The present invention provides a reverse transcriptase mutant which high temperature resistant and has high reverse transcription efficiency.
(2) The reverse transcriptase mutant with high reverse transcription efficiency of the present invention has significantly higher amplification efficiency than the wild-type M-MLV enzyme under the same conditions, and thus could significantly improve the detection efficiency.
(3) The present invention performs multiple rounds of screening from dozens of mutants, and 6 high-temperature-resistant reverse transcriptase single-point mutants are screened out, which could maintain high reverse transcription efficiency at a reverse transcription temperature of 58° C. Moreover, three of the high-temperature-tolerant reverse transcriptase mutants could reach reaction equilibrium within 1 minute of reaction time. Therefore, each reverse transcriptase mutant obtained by screening of the present invention has unexpectedly excellent technical effects.
(4) The single mutation sites are combined to obtain a high temperature resistant reverse transcriptase mutant containing multiple mutation sites. The high temperature resistant reverse transcriptase mutant containing multiple mutation sites of the present invention has higher reverse transcription efficiency than those with single mutation site, and the combination of dominant mutation sites helps to improve the comprehensive performance of the M-MLV enzyme.

The present invention will be further elaborated below in conjunction with specific embodiments. It should be understood that these embodiments are only used to illustrate the present invention and not to limit the scope of the present invention. The experimental methods that are not specify detailed in the following examples are usually based on conventional conditions such as those described in the Sambrook et al., Molecular Cloning: A Laboratory Manual (translated by Huang et al., Science Press, Beijing, 2002), or in accordance with the conditions recommended by the manufacturer. Unless otherwise stated, percentages and parts are calculated by weight. The experimental materials and reagents used in the following examples can be obtained from commercial channels unless otherwise specified.

Example 1. Calculation and Screening of DDG Value of Each Site

The MMLV protein sequence was input into the Rosetta algorithm software Cyrus Bench (Cyrus Biotechnology), and the DDG values of the amino acid segments of 0-100, 101-200, 201-300, 301-400, 401-500, 501-600, and 601-671 were calculated for all sites and all mutations, and the information of the mutation sites with a significantly reduced DDG value (DDG value <−2) was obtained as follows:

TABLE 1

| NO. | Wild-type amino acid | Position | Mutated amino acid | DDG value |
|---|---|---|---|---|
| Mu_1 | Lys | 62 | Asp | −2.45 |
| Mu_2 | Gln | 63 | Asp | −3.54 |
| Mu_3 | Tyr | 64 | Asp | −5.24 |
| Mu_4 | Met | 66 | Asp | −3.49 |
| Mu_5 | Ser | 67 | Asp | −5.24 |
| Mu_6 | Ala | 70 | Asp | −5.98 |
| Mu_7 | Arg | 71 | Asp | −8.52 |
| Mu_8 | Leu | 99 | Asp | −7.32 |
| Mu_9 | Lys | 102 | Asp | −4.25 |
| Mu_10 | Lys | 103 | Asp | −8.56 |
| Mu_11 | Thr | 106 | Asp | −9.21 |
| Mu_12 | Tyr | 109 | Asp | −7.34 |
| Mu_13 | Arg | 110 | Asp | −6.54 |
| Mu_14 | Arg | 116 | Asp | −2.34 |
| Mu_15 | Gln | 446 | Cys | −7.26 |
| Mu_16 | Trp | 313 | His | −9.45 |
| Mu_17 | Trp | 313 | Lys | −5.23 |
| Mu_18 | Asn | 107 | Cys | −8.54 |
| Mu_19 | Val | 223 | Lys | −6.79 |
| Mu_20 | Trp | 313 | Thr | −9.46 |
| Mu_21 | Trp | 313 | Asn | −11.35 |
| Mu_22 | Pro | 132 | Trp | −10.48 |
| Mu_23 | Leu | 183 | Cys | −6.45 |
| Mu_24 | Ile | 49 | Cys | −5.32 |
| Mu_25 | Trp | 313 | Arg | −4.26 |
| Mu_26 | Trp | 313 | Gln | −3.21 |
| Mu_27 | Leu | 188 | His | −7.64 |
| Mu_28 | Pro | 132 | Ala | −6.54 |
| Mu_29 | Ser | 195 | Leu | −11.56 |
| Mu_30 | Trp | 313 | Ser | −4.36 |
| Mu_31 | Leu | 478 | Trp | −5.67 |
| Mu_32 | Ile | 314 | His | −9.26 |
| Mu_33 | Trp | 145 | His | −10.64 |
| Mu_34 | Lys | 397 | Arg | −8.65 |
| Mu_35 | Asp | 524 | Gly | −7.92 |
| Mu_36 | Asp | 583 | Asn | −8.54 |
| Mu_37 | Leu | 435 | Arg | −7.56 |
| Mu_38 | Gln | 607 | Lys | −5.24 |
| Mu_39 | Val | 223 | Ala | −9.63 |
| Mu_40 | Gln | 221 | Arg | −10.79 |

Example 2. Construction of MMLV Mutation Library

Based on above protein sequences, codon optimization was performed in Suzhou Jinweizhi Biotechnoiogy Co., Ltd. and the DNA sequence was compiled (SEQ ID NO: 2).

Gene synthesis was performed by Suzhou Jinweizhi Biotechnoiogy Co., Ltd. according to above DNA sequences, and 5' (NheJ) and 3' (XhoJ) restriction sites were added. The gene was cloned into vector pET28a through 5' NheJ and 3' XhoJ, plasmid WT-pET28a was constructed, the recombinant plasmid DNA and the glycerol stocks containing the recombinant plasmid were prepared, and the plasmid WT-pET28a was subjected to site-directed mutation according to the mutation sites involved in Example 1 to construct the mutation library of Mu1-pET28a Mu40-pET28a.

Example 3. Expression and Purification of MMLV Mutant

WT-pET28a and Mu1-40-pET28a plasmids were transformed into BL21(DE3) competent cells to obtain 37 expression host bacteria, then they were transferred to 3 ml LB medium, cultured with shaking at 37° C. for 5 hours, then added with 0.1 Mm IPTG at 18° C. for induction overnight. The induced cells were collected, added with lysate (50 Mm Tris, 50 Mm NaCl, pH7.5), ultrasonically lysed, and centrifuged to separate supernatant. The supernatant was taken and purified with Ni NTA metal ion chelating filler to obtain wild-type and 40 mutant MMLV proteins

Example 4. Screening of Mutants

A: The First Round of Screening (Screening for Mutations that Maintain Activity)

Total RNA was extracted from Hela cells as template, and reverse transcription reaction was performed according to the following system:

| | |
|---|---|
| Total RNA | 500 ng |
| 5XRT buffer | 4 ul |
| dNTPs (2.5 mM) | 2 ul |
| Random 6 random primers (20 pmol/ul) | 1 ul |
| MMLV protein sample | 1 ul |
| DdH$_2$O | to 20 ul |

The wild-type and 36 mutant MMLV proteins were subjected to reaction according to above system, 42° C. for 15 minutes and 75° C. for 5 minutes for inactivation. Then the reverse transcription product was taken and fluorescence quantitative PCR detection was performed according to the following system:

| | |
|---|---|
| Reverse transcription product | 1 ul |
| GAPDH-PF primer (2 pmol/ul) | 2 ul |
| GAPDH-PR primer (2 pmol/ul) | 2 ul |
| 2XQ-PCR Mix | 10 ul |
| DdH$_2$O | 5 ul |

Q-PCR program: 95° C. for 3 minutes, (95° C. for 15 seconds, 60° C. for 15 seconds, 72° C. for 15 seconds, and reading fluorescence signal)×40 cycles.

The fluorescent quantitative PCR results of the reverse transcription products of each mutant were shown in the following table:

TABLE 2

| No. | ct mean | No. | Ct Mean |
|---|---|---|---|
| WT | 24.57 | Mu_8 | 27.39 |
| Mu_36 | 20.40 | Mu_20 | 28.15 |
| Mu_38 | 20.67 | Mu_9 | 28.23 |
| Mu_16 | 20.69 | Mu_32 | 28.32 |
| Mu_40 | 20.82 | Mu_6 | 28.83 |
| Mu_28 | 22.39 | Mu_37 | 28.84 |
| Mu_11 | 22.93 | Mu_3 | 28.94 |
| Mu_1 | 23.25 | Mu_5 | 29.36 |
| Mu_31 | 23.30 | Mu_17 | 30.54 |

TABLE 2-continued

| No. | ct mean | No. | Ct Mean |
|---|---|---|---|
| Mu_33 | 23.49 | Mu_29 | 30.82 |
| Mu_15 | 23.57 | Mu_4 | 30.88 |
| Mu_24 | 23.67 | Mu_19 | 30.94 |
| Mu_7 | 23.99 | Mu_10 | 31.26 |
| Mu_23 | 24.33 | Mu_14 | 31.52 |
| Mu_26 | 24.41 | Mu_25 | 31.60 |
| Mu_30 | 24.71 | Mu_13 | 31.62 |
| Mu_2 | 25.24 | Mu_12 | 31.88 |
| Mu_21 | 25.53 | Mu_27 | 32.39 |
| Mu_22 | 25.54 | | |
| Mu_34 | 25.67 | | |
| Mu_18 | 25.90 | | |

The ct values of the 14 underlined mutants were lower than that of the wild type, that is, their reverse transcription efficiency was higher than that of the wild type. These mutants were selected for the second round of screening.

B: The Second Round of Screening (Screening for High Temperature Resistant Mutations)

The mutants screened out in the first round were selected to be subjected to the reverse transcription reaction according to the reverse transcription reaction system of the first round, wherein the temperature was increased to 50, 55, and 58° C., and then detected for their reverse transcription efficiency according to the fluorescence quantitative PCR system of the first round. The results were as follows:

TABLE 3

| Group | 50° C./ ct mean | 55° C./ ct mean | 58° C./ ct mean | Reverse transcription efficiency (%, 58° C.) |
|---|---|---|---|---|
| WT | 21.11 | 22.35 | 24.01 | 100% |
| Mu_1 | 19.64 | 20.92 | 22.93 | 211.40% |
| Mu_7 | 16.4 | 19.7 | 19.93 | 1691.23% |
| Mu_11 | 16.97 | 17.54 | 18.48 | 4620.57% |
| Mu_15 | 19.17 | 19.2 | 18.7 | 3967.06% |
| Mu_16 | 19.97 | 18.55 | 18.91 | 3429.68% |
| Mu_23 | 19.59 | 19.42 | 20.69 | 998.66% |
| Mu_24 | 20.91 | 21.93 | 20.6 | 1062.95% |
| Mu_26 | 17.57 | 17.19 | 15.22 | 44264.31% |
| Mu_28 | 19.06 | 19.75 | 22.06 | 386.37% |
| Mu_31 | 19.73 | 21.46 | 23.54 | 138.51% |
| Mu_33 | 19.96 | 21 | 22.34 | 318.21% |
| Mu_36 | 17.16 | 16.48 | 14.43 | 76536.28% |
| Mu_38 | 20.61 | 20.71 | 19.52 | 2247.11% |
| Mu_40 | 18.82 | 18.84 | 18.47 | 4652.71% |

Notes: the efficiency of wild-type reverse transcriptase was set as 100%, the efficiency of mutants compared to that of the wild-type reverse transcriptase was calculated according to the following formula:

$$\text{Reverse transcription efficiency} = 100\% \times 2^{(Ct_{wild-type} - Ct_{mutant})}$$

From the results of the second round of screening, the reverse transcription efficiency of 6 mutants of Mu_15, 16, 26, 36, 38, 40, at 58° C. was not lower than that at 50° C. These 6 mutants were selected for the third round of screening.

C: The Third Round of Screening (Screening for High Synthesis Rate Mutations)

The mutants screened out in the second round were selected to be subjected to the reverse transcription reaction according to the reverse transcription reaction system of the first round, wherein the reverse transcription reaction temperature is 55° C., and the reaction time is 1 minute, 2 minutes, and 5 minutes, and then the reverse transcription efficiency was detected according to fluorescent quantitative PCR in the first round. The results were as follows:

TABLE 4

| Group | 1 min/ ct mean | 2 min/ ct mean | 5 min/ ct mean |
|---|---|---|---|
| WT | 24.88 | 22.99 | 21.85 |
| 15 | 22.24 | 20.28 | 19.17 |
| 16 | 20.01 | 19.25 | 19.47 |
| 26 | 21.17 | 20.79 | 17.72 |
| 36 | 17.64 | 17.92 | 17.93 |
| 38 | 21.15 | 20.73 | 20.14 |
| 40 | 18.95 | 19.00 | 18.34 |

From the results of the third round of screening, there was little difference between 1 minute and 5 minutes for reverse transcription reaction of Mu_16, 36, and 40, which proved that the reaction reached equilibrium after 1 minute.

Example 5

The following 6 mutation sites that could achieve high temperature resistance and high activity of M-MLV enzyme were screened out in above examples:

| No. | Wild-type amino acid | Position | Mutated amino acid |
|---|---|---|---|
| Mu_15 | Gln | 446 | Cys |
| Mu_16 | Trp | 313 | His |
| Mu_26 | Trp | 313 | Gln |
| Mu_36 | Asp | 583 | Asn |
| Mu_38 | Gln | 607 | Lys |
| Mu_40 | Gln | 221 | Arg |

In this example, the above 6 mutation sites were combined to construct 10 MMLV mutants, and it was expected to obtain MMLV mutants with better performance than the above 6 single point mutations.

The wild-type MMLV protein sequence was mutated according to the mutation site design in the table below.

The wild-type MMLV protein sequence was set forth in SEQ ID NO: 1.

| No. | Wild-type amino acid | Position | Mutated amino acid |
|---|---|---|---|
| Mu_41 | Asp | 583 | Asn |
| | Trp | 313 | Gln |
| Mu_42 | Asp | 583 | Asn |
| | Trp | 313 | His |
| Mu_43 | Trp | 313 | Gln |
| | Gln | 221 | Arg |
| Mu_44 | Asp | 583 | Asn |
| | Gln | 446 | Cys |
| Mu_45 | Asp | 583 | Asn |
| | Gln | 221 | Arg |
| Mu_46 | Trp | 313 | Gln |
| | Gln | 446 | Cys |
| Mu_47 | Trp | 313 | Gln |
| | Gln | 607 | Lys |
| Mu_48 | Trp | 313 | Gln |
| | Asp | 583 | Asn |
| | Gln | 221 | Arg |
| Mu_49 | Trp | 313 | Gln |
| | Asp | 583 | Asn |
| | Gln | 607 | Lys |

-continued

| No. | Wild-type amino acid | Position | Mutated amino acid |
|---|---|---|---|
| Mu_50 | Trp | 313 | Gln |
|  | Asp | 583 | Asn |
|  | Gln | 446 | Cys |

Based on the above protein sequence, codon optimization was performed by Suzhou Jinweizhi Biotechnology Co., Ltd. and the DNA sequence was compiled. The wild-type MMLV DNA sequence (WT) is set forth as SEQ ID NO: 2.

Gene synthesis was performed by Suzhou Jinweizhi Biotechnology Co., Ltd. according to the above DNA sequence, and 5'(NheI) and 3'(XhoI) restriction sites were added. The gene was cloned into vector pET28a through 5' NheI and 3' XhoI to construct plasmid WT-pET28a. The recombinant plasmid DNA and the glycerol strain containing the recombinant plasmid were prepared, and site-directed mutation was performed on plasmid WT-pET28a according to the involved mutation sites to construct the mutant library of Mu41-pET28a to Mu50-pET28a.

Example 6. Expression and Purification of MMLV Mutant

Mu41 to Mu50-pET28a plasmids were transformed into BL21(DE3) competent cells to obtain 37 expression host bacteria, which were then transferred to 3 ml LB medium, cultured with shaking at 37° C. for 5 hours, and then added with 0.1 Mm IPTG for induction overnight at 18° C. The induced cells were collected, added with lysate (50 Mm Tris, 50 Mm NaCl, pH7.5), ultrasonically lysed, and centrifuged to separate supernatant. The supernatant was taken and purified with Ni NTA metal ion chelating filler to obtain 10 mutant MMLV proteins.

Example 7. Comparison Between 10 Mutant Enzymes and Single-Point Mutant MMLVs for Heat Resistance 10 mutant enzyme proteins of Mu41 to Mu50 and 6 MMLV mutant enzyme proteins of Mu_15, 16, 26, 36, 38, and 40 were taken at a concentration of 200 U/ul, and placed in a constant temperature metal bath at 50° C. for 60 minutes or in a constant temperature metal bath at 50° C., 55° C., 60° C., 65° C., and 70° C. for 15 minutes, and then subjected to the reverse transcription reaction with the unheated enzyme sample. Total RNA was extracted from Hela cells as template, and the reverse transcription reaction system was as follows:

| Total RNA | 500 ng |
|---|---|
| 5XRT buffer | 4 ul |
| dNTPs (2.5 mM) | 2 ul |
| Random 6 random primers (20 pmol/ul) | 1 ul |
| MMLV protein sample | 1 ul |
| DdH$_2$O | to 20 ul |

42° C. for 15 minutes, and 95° C. for 5 minutes for inactivation. Then the reverse transcription product was taken and subjected to fluorescence quantitative PCR detection according to the following system:

| Reverse transcription product | 1 ul |
|---|---|
| GAPDH-PF primer (2 pmol/ul) | 2 ul |
| GAPDH-PR primer (2 pmol/ul) | 2 ul |
| 2XQ-PCR Mix | 10 ul |
| DdH$_2$O | 5 ul |

Q-PCR program: 95° C. for 3 minutes, (95° C. for 15 seconds, 60° C. for 15 seconds, 72° C. for 15 seconds, and reading fluorescence signal)×40 cycles.

Fluorescence quantitative PCR results (Ct value) were shown in the following table:

|  | Unheated | Heating for 60 min 50° C. | Heating for 15 min | | | | |
|---|---|---|---|---|---|---|---|
|  |  |  | 50° C. | 55° C. | 60° C. | 65° C. | 70° C. |
| Mu_15 | 21.45 | 22.18 | 21.56 | 22.45 | 25.64 | 30.68 | 32.14 |
| Mu_16 | 21.54 | 22.25 | 21.49 | 22.98 | 24.36 | 30.54 | 32.14 |
| Mu_26 | 20.13 | 20.59 | 20.26 | 21.34 | 23.39 | 30.96 | 32.11 |
| Mu_36 | 20.41 | 20.98 | 20.56 | 21.65 | 25.14 | 28.67 | 32.09 |
| Mu_38 | 21.14 | 21.66 | 21.23 | 22.68 | 26.73 | 29.33 | 32.48 |
| Mu_40 | 21.45 | 21.37 | 21.29 | 22.97 | 23.54 | 26.52 | 30.49 |
| Mu_41 | 20.15 | 20.49 | 20.32 | 20.56 | 22.67 | 25.99 | 30.25 |
| Mu_42 | 20.35 | 20.57 | 20.33 | 20.98 | 21.97 | 23.76 | 26.33 |
| Mu_43 | 20.33 | 20.42 | 20.31 | 20.55 | 22.59 | 25.48 | 28.44 |
| Mu_44 | 21.14 | 21.37 | 21.22 | 21.53 | 23.49 | 26.87 | 29.55 |
| Mu_45 | 21.06 | 21.22 | 21.15 | 21.59 | 23.64 | 25.79 | 28.63 |
| Mu_46 | 21.23 | 21.68 | 21.57 | 22.01 | 24.68 | 26.77 | 28.41 |
| Mu_47 | 20.86 | 20.88 | 20.98 | 21.34 | 22.54 | 24.68 | 26.11 |
| Mu_48 | 19.68 | 19.97 | 20.02 | 20.16 | 21.96 | 23.49 | 26.96 |
| Mu_49 | 19.47 | 19.96 | 19.88 | 20.04 | 21.36 | 24.01 | 27.17 |
| Mu_50 | 20.16 | 20.33 | 20.24 | 20.31 | 21.57 | 23.24 | 26.97 |

From above results, it could be seen that the combination mutants of Mu_40 to Mu_50 were more stable than the single-point mutants at temperatures above 55° C. After treatment at 50° C. for 1 hour, the reverse transcription performance of the enzymes substantially has no change.

Example 8. Comparison Between 10 Mutant Enzymes and Single-Point Mutant MMLVs for Reaction Rate The reverse transcription reaction was performed according to the above reverse transcription reaction system of Example 7, wherein the reaction temperature was 55° C., the reverse transcription time was 30 seconds, 1 minute, 2 minutes, and 3 minutes, respectively. The reverse transcription products were detected by fluorescent quantitative PCR, wherein the reaction system was same to Example 3. The Ct value results were as follows:

|  | Reverse transcription time | | | |
| --- | --- | --- | --- | --- |
|  | 30 sec | 1 min | 2 min | 3 min |
| Mu_15 | 24.35 | 23.49 | 22.28 | 22.34 |
| Mu_16 | 25.63 | 24.26 | 22.67 | 22.54 |
| Mu_26 | 23.55 | 22.13 | 21.49 | 21.31 |
| Mu_36 | 22.98 | 22.04 | 21.78 | 21.98 |
| Mu_38 | 24.98 | 23.49 | 22.34 | 22.77 |
| Mu_40 | 24.68 | 23.46 | 22.87 | 22.58 |
| Mu_41 | 21.97 | 21.68 | 21.32 | 20.97 |
| Mu_42 | 20.97 | 20.67 | 20.13 | 19.98 |
| Mu_43 | 22.34 | 22.06 | 21.37 | 21.49 |
| Mu_44 | 22.37 | 21.98 | 21.59 | 21.67 |
| Mu_45 | 21.97 | 21.44 | 21.54 | 21.36 |
| Mu_46 | 24.23 | 23.98 | 23.67 | 23.97 |
| Mu_47 | 21.87 | 21.3 | 21.24 | 21.39 |
| Mu_48 | 21.35 | 21.22 | 21.49 | 21.2 |
| Mu_49 | 21.09 | 20.34 | 20.19 | 20.08 |
| Mu_50 | 22.38 | 22.09 | 21.67 | 21.87 |

From above results, it could be seen that the ct values of Mu_42, Mu_45, Mu_47, Mu_48, and Mu_49 after 1 minute of reaction were substantially identical to those after 2 and 3 minutes, so it was concluded that they reached equilibrium after 1 minute of reaction. The ct values of the 10 combination mutants were all lower than those of the single-point mutants for the same reaction time, which proved that the combination of dominant mutation sites helped to improve the comprehensive performance of M-MLV enzyme.

Example 9. Use in Detection of Novel Coronavirus Nucleic Acid

This example provides use of the screened combination mutant M-MLV enzymes in the detection reagent of novel coronavirus (2019-nCoV).

Fluorescent quantitative PCR method was used to detect the sequence of the ORF1ab gene and N gene of the 2019-nCoV virus. The sequence information of the primers and probes used was as follows:

```
Target 1 (ORF1ab):
Forward primer (F):
                                      (SEQ ID NO: 5)
CCCTGTGGGTTTTACACTTAA Reverse primer (R):
                                      (SEQ ID NO: 6)
ACGATTGTGCATCAGCTGA Fluorescent probe (P):
                                      (SEQ ID NO: 7)
5'-FAM-CCGTCTGCGGTATGTGGAAAGGTTATGG-BHQ1-3'

Target 2 (N):
Forward primer (F):
                                      (SEQ ID NO: 8)
GGGGAACTTCTCCTGCTAGAAT Reverse primer (R):
                                      (SEQ ID NO: 9)
CAGACATTTTGCTCTCAAGCTG Fluorescent probe (P):
                                      (SEQ ID NO: 10)
5'-FAM-TTGCTGCTGCTTGACAGATT-TAMRA-3'
```

The reaction system was formulated as follows:

| 2019-nCoV reference sample | 5 ul |
| --- | --- |
| 5XRT buffer | 5 ul |
| dNTPs (2.5 mM) | 2 ul |
| Primers (2 pmol/ul) | 2 ul |
| Probe (10 pmol/ul) | 0.5 ul |
| MMLV protein sample | 1 ul |
| Hot-start Taq enzyme (5 U/ul) | 1 ul |
| DdH$_2$O | to 25 ul |

After formulating the reaction system, RT-PCR reaction was performed as follows: 55° C. for 5 minutes, 95° C. for 2 minutes, (95° C. for 30 seconds; 68° C. for 1 minute, and reading fluorescence)×40 cycles. The results were as follows:

|  | Ct value | |
| --- | --- | --- |
|  | ORF1ab gene | N gene |
| Mu_42 | 32.6 | 31.9 |
| Mu_45 | 33.4 | 32.4 |
| Mu_47 | 34.2 | 33.8 |
| Mu_48 | 31.7 | 32.6 |
| Mu_49 | 33.2 | 32.8 |
| Wild-type M-MLV enzyme | 38.5 | 37.2 |

The ct difference (ΔCt) between the five combination mutant enzymes and the wild-type M-MLV enzyme was compared, and the fold change in amplification efficiency for ORF1ab and N gene with the wild-type M-MLV enzyme was calculated as follows:

|  | ORF1ab gene | | N gene | |
| --- | --- | --- | --- | --- |
|  | Δ Ct | Fold change in amplification efficiency | Δ Ct | Fold change in amplification efficiency |
| Mu_42 | 5.9 | 59.71 | 5.3 | 39.40 |
| Mu_45 | 5.1 | 34.30 | 4.8 | 27.86 |
| Mu_47 | 4.3 | 19.70 | 3.4 | 10.56 |
| Mu_48 | 6.8 | 111.43 | 4.6 | 24.25 |
| Mu_49 | 5.3 | 39.40 | 4.4 | 21.11 |

From the amplification Ct values of different combination mutant MMLVs and wild-type M-MLV enzymes on the novel coronavirus reference sample, it could be seen the amplification efficiency of the mutant was significantly higher than that of the wild-type.

All documents mentioned in the present invention are cited as references in this application, as if each document was individually cited as a reference. In addition, it should be understood that after reading the above teaching content of the present invention, those skilled in the art can make various changes or modifications to the present invention, and these equivalent forms also fall within the scope defined by the appended claims of the present application.

The invention claimed is:

1. A reverse transcriptase mutant having mutation(s) at amino acid residue(s) selected from the group consisting of: 313, 446, and 583,
   wherein the amino acid residues are numbered according to SEQ ID NO: 1, a wild-type murine leukemia virus reverse transcriptase (M-MLV), and
   wherein a reverse transcription efficiency of the reverse transcriptase mutant is higher compared to the wild-type murine leukemia virus reverse transcriptase.

2. The reverse transcriptase mutant of claim 1, wherein the amino acid residue 446 is mutated to Cys, the amino acid residue 313 is mutated to Gln, and the amino acid residue 583 is mutated to Asn.

3. The reverse transcriptase mutant of claim 1, wherein the reverse transcriptase mutant has mutations at the amino acid residues 583 and 446, wherein the amino acid residue 583 is mutated to Asn, and the amino acid residue 446 is mutated to Cys, or the reverse transcriptase mutant has mutations at the amino acid residues 313 and 446, wherein the amino acid residue 313 is mutated to Gln, and the amino acid residue 446 is mutated to Cys, or the reverse transcriptase mutant has mutations at the amino acid residues 313, 583 and 446, and wherein the amino acid residue 313 is mutated to Gln, the amino acid residue 583 is mutated to Asn, and the amino acid residue 446 is mutated to Cys.

4. A method for RNA reverse transcription comprising:
providing an RNA-containing sample; and performing a reverse transcription reaction of the RNA-containing sample with the reverse transcriptase mutant of claim 1.

* * * * *

SEQUENCE LISTING

<160> NUMBER OF SEQ ID NOS: 10

<210> SEQ ID NO 1
<211> LENGTH: 671
<212> TYPE: PRT
<213> ORGANISM: Murine leukemia virus

<400> SEQUENCE: 1

Thr Leu Asn Ile Glu Asp Glu His Arg Leu His Glu Thr Ser Lys Glu
1               5                   10                  15

Pro Asp Val Ser Leu Gly Ser Thr Trp Leu Ser Asp Phe Pro Gln Ala
            20                  25                  30

Trp Ala Glu Thr Gly Gly Met Gly Leu Ala Val Arg Gln Ala Pro Leu
        35                  40                  45

Ile Ile Pro Leu Lys Ala Thr Ser Thr Pro Val Ser Ile Lys Gln Tyr
50                  55                  60

Pro Met Ser Gln Glu Ala Arg Leu Gly Ile Lys Pro His Ile Gln Arg
65                  70                  75                  80

Leu Leu Asp Gln Gly Ile Leu Val Pro Cys Gln Ser Pro Trp Asn Thr
                85                  90                  95

Pro Leu Leu Pro Val Lys Lys Pro Gly Thr Asn Asp Tyr Arg Pro Val
            100                 105                 110

Gln Asp Leu Arg Glu Val Asn Lys Arg Val Glu Asp Ile His Pro Thr
        115                 120                 125

Val Pro Asn Pro Tyr Asn Leu Leu Ser Gly Leu Pro Pro Ser His Gln
130                 135                 140

Trp Tyr Thr Val Leu Asp Leu Lys Asp Ala Phe Phe Cys Leu Arg Leu
145                 150                 155                 160

His Pro Thr Ser Gln Pro Leu Phe Ala Phe Glu Trp Arg Asp Pro Glu
                165                 170                 175

Met Gly Ile Ser Gly Gln Leu Thr Trp Thr Arg Leu Pro Gln Gly Phe
            180                 185                 190

Lys Asn Ser Pro Thr Leu Phe Asp Glu Ala Leu His Arg Asp Leu Ala
        195                 200                 205

Asp Phe Arg Ile Gln His Pro Asp Leu Ile Leu Leu Gln Tyr Val Asp
210                 215                 220

Asp Leu Leu Leu Ala Ala Thr Ser Glu Leu Asp Cys Gln Gln Gly Thr
225                 230                 235                 240

Arg Ala Leu Leu Gln Thr Leu Gly Asn Leu Gly Tyr Arg Ala Ser Ala
                245                 250                 255

Lys Lys Ala Gln Ile Cys Gln Lys Gln Val Lys Tyr Leu Gly Tyr Leu
            260                 265                 270

Leu Lys Glu Gly Gln Arg Trp Leu Thr Glu Ala Arg Lys Glu Thr Val
        275                 280                 285

Met Gly Gln Pro Thr Pro Lys Thr Pro Arg Gln Leu Arg Glu Phe Leu
290                 295                 300

Gly Thr Ala Gly Phe Cys Arg Leu Trp Ile Pro Gly Phe Ala Glu Met
305                 310                 315                 320

Ala Ala Pro Leu Tyr Pro Leu Thr Lys Thr Gly Thr Leu Phe Asn Trp
                325                 330                 335

Gly Pro Asp Gln Gln Lys Ala Tyr Gln Glu Ile Lys Gln Ala Leu Leu
            340                 345                 350

Thr Ala Pro Ala Leu Gly Leu Pro Asp Leu Thr Lys Pro Phe Glu Leu
        355                 360                 365

Phe Val Asp Glu Lys Gln Gly Tyr Ala Lys Gly Val Leu Thr Gln Lys
370                     375                 380

Leu Gly Pro Trp Arg Arg Pro Val Ala Tyr Leu Ser Lys Lys Leu Asp
385                 390                 395                 400

Pro Val Ala Ala Gly Trp Pro Pro Cys Leu Arg Met Val Ala Ala Ile
                405                 410                 415

Ala Val Leu Thr Lys Asp Ala Gly Lys Leu Thr Met Gly Gln Pro Leu
            420                 425                 430

Val Ile Leu Ala Pro His Ala Val Glu Ala Leu Val Lys Gln Pro Pro
        435                 440                 445

Asp Arg Trp Leu Ser Asn Ala Arg Met Thr His Tyr Gln Ala Leu Leu
450                 455                 460

Leu Asp Thr Asp Arg Val Gln Phe Gly Pro Val Val Ala Leu Asn Pro
465                 470                 475                 480

Ala Thr Leu Leu Pro Leu Pro Glu Glu Gly Leu Gln His Asn Cys Leu
                485                 490                 495

Asp Ile Leu Ala Glu Ala His Gly Thr Arg Pro Asp Leu Thr Asp Gln
            500                 505                 510

Pro Leu Pro Asp Ala Asp His Thr Trp Tyr Thr Asp Gly Ser Ser Leu
        515                 520                 525

Leu Gln Glu Gly Gln Arg Lys Ala Gly Ala Ala Val Thr Thr Glu Thr
530                 535                 540

Glu Val Ile Trp Ala Lys Ala Leu Pro Ala Gly Thr Ser Ala Gln Arg
545                 550                 555                 560

Ala Glu Leu Ile Ala Leu Thr Gln Ala Leu Lys Met Ala Glu Gly Lys
                565                 570                 575

Lys Leu Asn Val Tyr Thr Asp Ser Arg Tyr Ala Phe Ala Thr Ala His
            580                 585                 590

Ile His Gly Glu Ile Tyr Arg Arg Arg Gly Leu Leu Thr Ser Glu Gly
        595                 600                 605

Lys Glu Ile Lys Asn Lys Asp Glu Ile Leu Ala Leu Leu Lys Ala Leu
610                 615                 620

Phe Leu Pro Lys Arg Leu Ser Ile Ile His Cys Pro Gly His Gln Lys
625                 630                 635                 640

Gly His Ser Ala Glu Ala Arg Gly Asn Arg Met Ala Asp Gln Ala Ala
                645                 650                 655

Arg Lys Ala Ala Ile Thr Glu Thr Pro Asp Thr Ser Thr Leu Leu
            660                 665                 670

<210> SEQ ID NO 2
<211> LENGTH: 2013
<212> TYPE: DNA
<213> ORGANISM: Artificial sequence
<220> FEATURE:
<223> OTHER INFORMATION: Codon-optimized wild-type M-MLV DNA sequence

<400> SEQUENCE: 2
acgctgaata tcgaggacga acaccgtctg cacgaaacca gcaaggagcc ggacgttagt    60
ctgggtagca cgtggctgag cgattttcca caagcgtggg cggaaaccgg tggtatgggt   120
ctcgccgttc gccaagcccc actcattatc ccactgaaag ccacgagcac gccggtgagc   180
atcaagcagt acccgatgag ccaagaagcc cgcctcggca ttaaaccgca tattcagcgt   240
ctgctggacc aaggcattct ggtgccgtgc cagagtccgt ggaatacgcc actgctcccg   300
gttaagaagc cgggcaccaa cgattatcgc ccggttcaag acctccgcga agtgaacaag   360

-continued

```
cgcgtggaag atatccatcc gaccgtgcca atccgtaca atctgctgag tggcctcccg      420
ccgagtcatc aatggtacac cgtgctggat ctcaaggatg cgttttctg cctccgtctg      480 catccaacca gccagccact ctttgcgttt gagtggcgcg acccagaaat gggtatcagc     540
ggtcaactga cgtggacgcg tctgccgcaa ggcttcaaaa acagcccgac gctgttcgat     600
gaggccctcc atcgcgatct ggcggatttc cgtatccagc atccagatct gattctgctg     660
cagtacgttg acgatctgct cctcgcggcc accagtgaac tggattgcca gcaaggtacc     720
cgtgcgctgc tgcagacgct gggcaatctg gctaccgtg ccagcgcgaa aaaggcgcaa      780
atctgccaga agcaagttaa gtacctcggt tatctgctga agagggtca acgctggctg      840 accgaggcgc gtaaagagac cgttatgggt cagccaacgc caaagacgcc acgccagctc     900
cgcgaatttc tgggtaccgc cggcttctgt cgtctgtgga ttccgggctt cgcggaaatg     960
gcggcgccac tctacccgct gaccaaaacc ggtaccctct tcaattgggg cccagatcag    1020
cagaaggcct accaagaaat taaacaagcg ctgctcaccg cgccggccct cggtctccca    1080
gatctgacca aaccgtttga gctgttcgtg gacgagaagc aaggctacgc caaaggcgtg    1140
ctgacccaga aactcggtcc atggcgtcgt ccggtggcct acctcagtaa gaaactggat    1200
ccagttgcgg cgggttggcc gccatgtctc cgtatggtgg cggcgattgc cgttctgacc    1260
aaagacgccg gcaaactcac catgggtcag ccgctggtta ttctcgcccc acatgcggtg    1320
gaagcgctgg ttaaacaacc gccagaccgc tggctgagca atgcccgcat gacccattat    1380
caagcgctgc tgctggacac cgaccgcgtt cagttcggtc cggtggttgc gctgaatcca    1440
gcgacgctgc tgccgctgcc agaagaaggt ctgcagcaca actgtctgga cattctggcc    1500
gaggcccatg gcacccgtcc agatctcacc gatcagccac tgccagacgc cgatcatacg    1560
tggtacaccg atggtagtag tctgctgcaa gaaggtcaac gtaaagcggg tgccgcggtg    1620
acgacggaaa ccgaggtgat ctgggccaaa gcgctgccag cgggtaccag cgcgcaacgt    1680
gcggaactga tcgcgctgac ccaagcgctc aaaatggccg agggcaagaa actcaacgtg    1740
tacaccgaca gtcgctacgc gtttgcgacc gcgcacatcc acggtgagat ttatcgccgc    1800
cgtggtctgc tcacgagcga aggtaaggag atcaagaata aggacgagat cctcgcgctg    1860
ctgaaagccc tctttctgcc gaaacgtctg agcatcatcc attgcccggg tcaccagaag    1920
ggccacagtg cggaagcgcg cggtaatcgc atggccgatc aagccgcgcg caaagcggcg    1980
attacggaaa ccccggatac gagcacgctg ctg                                 2013
```

```
<210> SEQ ID NO 3
<211> LENGTH: 20
<212> TYPE: DNA
<213> ORGANISM: Artificial sequence
<220> FEATURE:
<223> OTHER INFORMATION: Primer

<400> SEQUENCE: 3
gcctgcttca ccaccttctt                                                  20

<210> SEQ ID NO 4
<211> LENGTH: 20
<212> TYPE: DNA
<213> ORGANISM: Artificial sequence
<220> FEATURE:
<223> OTHER INFORMATION: Primer

<400> SEQUENCE: 4
tgaacgggaa gctcactggc                                                  20
```

```
<210> SEQ ID NO 5
<211> LENGTH: 21
<212> TYPE: DNA
<213> ORGANISM: Artificial sequence
<220> FEATURE:
<223> OTHER INFORMATION: Primer

<400> SEQUENCE: 5
ccctgtgggt tttacactta a                                        21

<210> SEQ ID NO 6
<211> LENGTH: 19
<212> TYPE: DNA
<213> ORGANISM: Artificial sequence
<220> FEATURE:
<223> OTHER INFORMATION: Primer

<400> SEQUENCE: 6
acgattgtgc atcagctga                                           19

<210> SEQ ID NO 7
<211> LENGTH: 28
<212> TYPE: DNA
<213> ORGANISM: Artificial sequence
<220> FEATURE:
<223> OTHER INFORMATION: Primer

<400> SEQUENCE: 7
ccgtctgcgg tatgtggaaa ggttatgg                                 28

<210> SEQ ID NO 8
<211> LENGTH: 22
<212> TYPE: DNA
<213> ORGANISM: Artificial sequence
<220> FEATURE:
<223> OTHER INFORMATION: Primer

<400> SEQUENCE: 8
ggggaacttc tcctgctaga at                                       22

<210> SEQ ID NO 9
<211> LENGTH: 22
<212> TYPE: DNA
<213> ORGANISM: Artificial sequence
<220> FEATURE:
<223> OTHER INFORMATION: Primer

<400> SEQUENCE: 9
cagacatttt gctctcaagc tg                                       22

<210> SEQ ID NO 10
<211> LENGTH: 20
<212> TYPE: DNA
<213> ORGANISM: Artificial sequence
<220> FEATURE:
<223> OTHER INFORMATION: Primer

<400> SEQUENCE: 10
ttgctgctgc ttgacagatt                                          20
```